J. A. DOMPIER.
TAPER DRILL CHUCK.
APPLICATION FILED SEPT. 29, 1914.
1,157,513.
Patented Oct. 19, 1915.
2 SHEETS—SHEET 1.
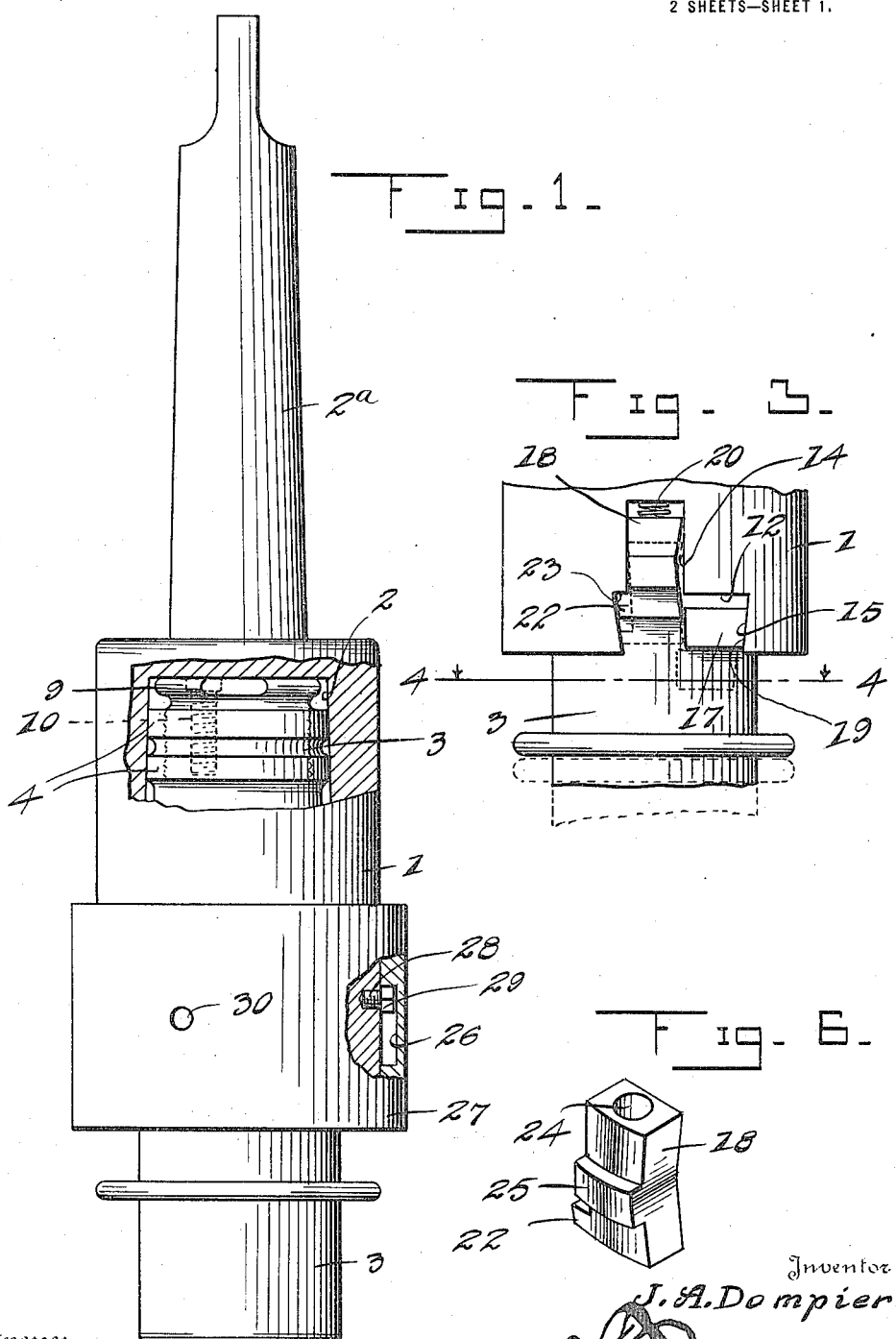

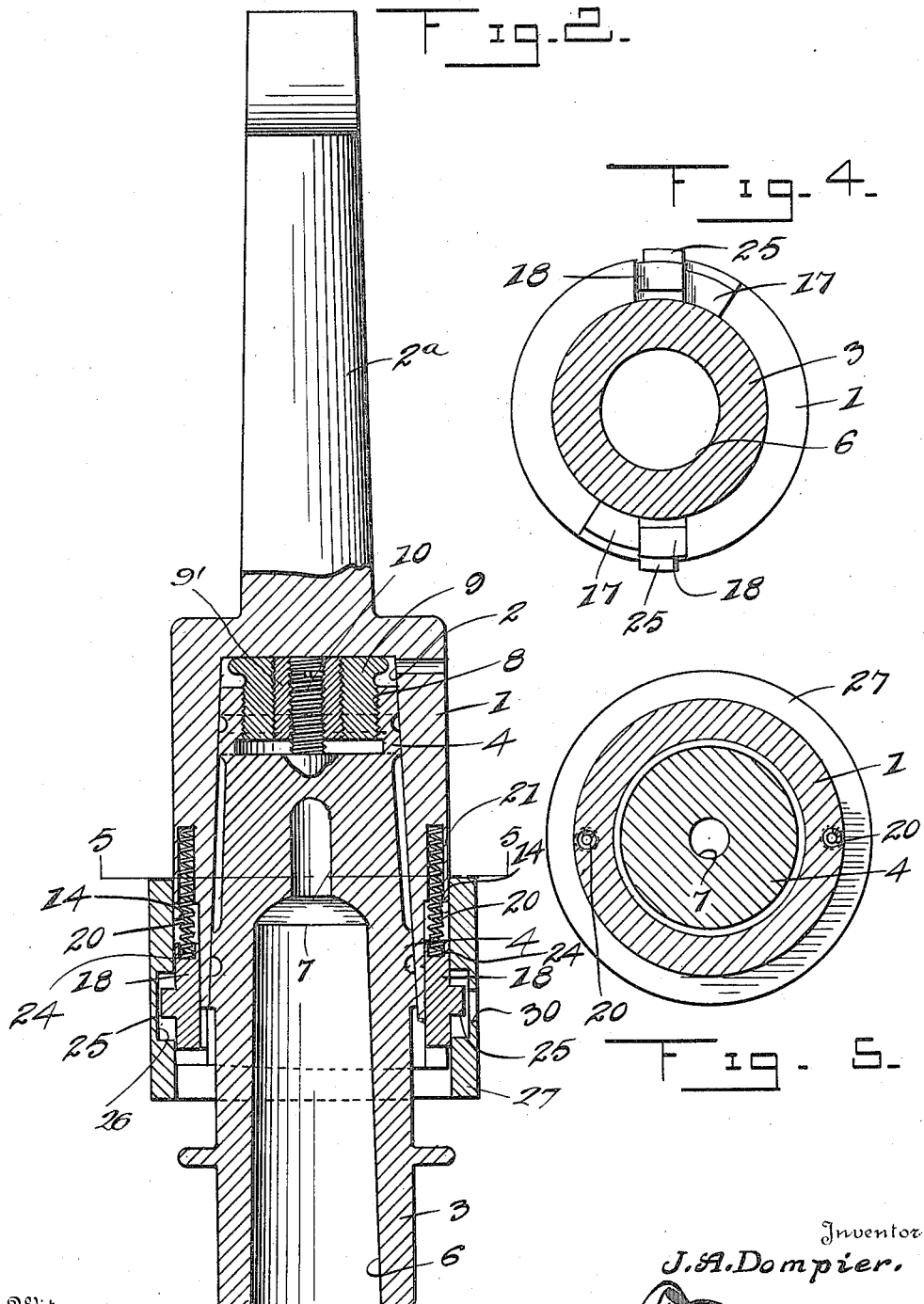

UNITED STATES PATENT OFFICE.

JAMES A. DOMPIER, OF DETROIT, MICHIGAN.

TAPER DRILL-CHUCK.

1,157,513.  Specification of Letters Patent.  Patented Oct. 19, 1915.

Application filed September 29, 1914. Serial No. 864,053.

*To all whom it may concern:*

Be it known that I, JAMES A. DOMPIER, a citizen of the United States, residing at Detroit, in the county of Wayne and State of Michigan, have invented certain new and useful Improvements in Taper Drill-Chucks; and I do hereby declare the following to be a full, clear, and exact description of the invention, such as will enable others skilled in the art to which it appertains to make and use the same.

This invention relates to taper drill chucks and the primary object of the invention is the provision of a drill chuck which employs a separate drill carrying collet for insertion into said chuck, providing a continuous running chuck with which drills may be changed while the chuck is in motion at a drilling speed, thereby eliminating the necessity of stopping or slowing down the drill press for changing drills.

Another object of this invention is the provision of a taper shanked collet fitting closely into a tapered bore, allowing rapid and easy entrance and withdrawal of the collet and absolute rigidity of the collet while inserted within the taper bore.

Another object of this invention is the provision of a novel form of lock latches for securely holding the collet within the chuck proper, which latches are manipulated for releasing the collet by the longitudinal movement of a ring upon the exterior of the chuck and which will securely hold the collet within the chuck proper and permit the chuck to be driven in any direction and in any position, vertically or otherwise.

A still further object of the invention is the provision of adjusting plugs mounted in the inner end of the collet whereby the plugs may be adjusted for regulating the distance of insertion of the collet within the chuck proper.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a side elevation of the improved taper drill chuck showing parts thereof broken away for exposing the adjustable means mounted in the inner end of the collet and also for exposing the manner of retaining the lock operating ring upon the exterior of the chuck. Fig. 2 is a central longitudinal sectional view through the improved chuck. Fig. 3 is a detail view in side elevation of the chuck showing one of the locking latches and the manner in which it coacts with the collet for securely holding the collet within the chuck and showing the latch operating ring removed. Fig. 4 is a cross sectional view on the line 4—4 of Fig. 3. Fig. 5 is a cross sectional view on the line 5—5 of Fig. 2, and Fig. 6 is a detail perspective view of one of the locking latches or lugs.

Referring more particularly to the drawings, 1 designates the drill chuck proper, which has a shank $2^a$ formed upon the upper end thereof for insertion into the chuck receiving shank of a drill press (not shown) or other similar machines in connection with which a chuck of this nature would be used. The chuck 1 is provided with a tapering recess 2 formed centrally therein, which tapering recess is provided for the reception of the collet 3. The collet 3 is tapered to snugly fit within the recess or bore 2 of the chuck 1 and it has annular rings 4 formed thereupon, which rings engage the inner walls of the recess 2 as is clearly shown in Fig. 2 of the drawings.

The collet 3 is provided with a tapering bore 6 which receives the shank of a drill bit or like tool (not shown) and it has a slot 7 extending transversely therethrough and communicating with the bore 6 as is ordinary in the construction of collets for retaining ordinary drill bits by means of which slot the removal of the bit is facilitated.

The upper end of the collet 3 has formed therein a recess 8 which is provided with internal screw threads, which threads coact with the external screw threads formed upon an adjusting lug 9. The adjusting lug 9 is adjustably mounted within the recess 8 so that it may be moved inwardly or outwardly for increasing or decreasing the length of the collet for regulating the insertion of the same into the bore 2 as desired. A locking screw 10 is mounted within the adjusting lug 9 and by moving this locking screw into or out of engagement with the inner horizontal wall of the recess 8 the adjustability of the lug 9 is retarded, owing to the fact that the base portion of the locking screw 10 being in engagement with the horizontal wall of the recess 8 will bind the threads upon the adjusting lug 9 in engagement with the internal screw threads of the recess and prevent the accidental turning of the plug within the recess. The locking screw 10 is mounted within a hollow screw 9', which is inserted through the adjustable lugs 9.

The chuck 1 is provided with recess or cut out portions 12 positioned diametrically opposite each other in the lower ends thereof, which recesses or cut out portions communicate with vertically extending recesses 14. The cut out portions 12 have their side walls 15 cut at an angle to their inner or horizontal wall as is clearly shown in Fig. 3 of the drawings, so that the locking lugs 17 which are formed upon the side of the collet 3 will be prevented from longitudinal movement when the locking lugs 18 force the lugs 17 into engagement with the angle side walls 15. The lugs 17 which are formed upon the collet 3 diametrically opposite each other have their edges 19 angled for abutting engagement with the angled walls 15 of the cut out portion 12 as is clearly shown in Fig. 3 of the drawings.

The recesses or cut out portions 14 have the locking lug 18 slidably seated therein, which locking lugs have coiled springs 20 abutting their inner ends. The springs 20 are seated in bores 21 which extend upwardly into the drill chuck and the springs tend to force the lugs 18 outwardly at all times. The lugs 18 have transversely extending lugs 22 formed thereupon which engage the angled side walls 15 of the cut out portion 12 and the shoulder 23 for limiting the inner movement of the locking lugs 18. The locking lugs have their sides which engage the lug 17 angled so that when the collet 3 is forced within the bore 2 of the drill chuck the locking lug will engage the lugs 17 formed upon the collet and the lugs 17 riding upon the angled sides of the lock lug 18 will be forced snugly into secure abutting engagement with the walls 15 of the cut out portions thereby securely locking the collet 3 within the bore 2 of the drill chuck.

The springs 20 are seated in bores 24 which are formed in the ends of the locking lugs 18.

The locking lugs 18 have lugs 25 formed upon the outwardly extending faces thereof which lugs are adapted for insertion in an annular groove 26 which is formed in a ring 27. The ring 27 is mounted upon the exterior of the chuck 1 and is provided for operating the locking lugs 18 for releasing the lugs 17 from binding engagement with the walls 15 of the cut out portion 12 for permitting the removal of the collet 3 from the chuck 1. The groove 26 is of greater width than the width of the lug 25 so as to permit of a certain amount of free movement of the ring prior to the operation of the lug.

Set screws 28 are seated in the chuck 1 and they have their heads 29 seated in the groove 26, for holding the ring 27 upon the outer surface of the chuck 1 and by having their heads 29 seated in the groove 26 they will permit of a limited amount of vertical sliding movement of the ring upon the chuck 1 as is obvious by reference to Fig. 1 of the drawings. The set screws 28 are inserted through openings 30, which are formed in the ring.

In the operation of the improved drill chuck as heretofore described: when it is desired to attach a drill to a drilling machine or drill press (not shown) the bit is attached to the collet 3 by the insertion of the bit shank (not shown) into the bore 6 and the collet 3 is inserted into the bore 2 of the drill chuck 1. In the inward forcing movement of the collet 3 the lugs 17 will move into the cut out portions 12 and upon further forcing inward movement of the collet the lugs 17 will be engaged by the locking lugs 18 which will force the lugs 17 into binding engagement with the angled sides 15 of the cut out portions 12 securely holding the collet 3 within the bore 2, owing to the angle of incline of the side walls 15 and the side 19 of the lug 17. When it is desired to remove the drill bit and the collet 3 from the chuck 1 the ring 27 is moved upwardly upon the chuck 1 and this moves or forces the locking lugs 18 upwardly within the recesses 14 causing them to be moved out of engagement with the lugs 17 thereby releasing the binding engagement between the sides 19 of the lugs 17 and the walls 15 of the cut out portions 12 thus permitting the easy removal of the collet 3.

From the foregoing description taken in connection with the accompanying drawings the advantages of the construction and of the method of operation of the improved taper drill chuck will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a taper drill chuck structure, a drill chuck having a tapering bore, a collet for insertion into said tapering bore, said drill chuck being provided with recesses having angled walls, spring pressed locking lugs carried by said chuck, lugs formed upon said collet for insertion into said recesses and for engagement with said locking lugs whereby they will be forced into binding engagement with one of the side walls of the recesses for securely holding said collet within said chuck, a ring mounted upon the exterior of said chuck for engagement with said locking lugs for moving them out of engagement with said collet carried lugs for permitting of the release of said collet from said chuck.

2. In a taper drill chuck structure, a drill chuck having a tapering bore, a collet for insertion into said bore, an adjustable plug mounted in the inner end of said collet, and a locking screw inserted through said adjustable plug for locking said plug in adjusted position.

3. In a taper drill chuck structure, a drill chuck having a tapering bore, a collet for insertion into said bore, an adjustable plug mounted in the inner end of said collet, a locking screw inserted through said adjustable plug for locking said plug in adjusted positions and means for locking said collet within said tapered bore.

4. In a drill chuck structure, the combination of a drill chuck having a bore, a drill holding collet for insertion into said bore, adjustable means carried by the inner end of said collet for limiting the insertion of said collet into said chuck, and means for locking said collet within said chuck.

5. In a taper drill chuck structure, a drill chuck having a tapering bore, a collet for insertion into said tapering bore, said drill chuck being provided with recesses having angled walls, spring pressed locking lugs carried by said chuck, lugs formed upon said collet for insertion into said recess and for engagement with said locking lugs whereby they will be forced into binding engagement with one of the side walls of the recess for securely holding said collet within said chuck, and adjustable means carried by the inner end of said collet for limiting the insertion of said collet into said tapering bore.

In testimony whereof I affix my signature in presence of two witnesses.

JAMES A. DOMPIER.

Witnesses:
 Gustav O. Kalz,
 Grace M. Kalz.

Copies of this patent may be obtained for five cents each, by addressing the "Commissioner of Patents, Washington, D. C."